US012561217B2

(12) United States Patent (10) Patent No.: US 12,561,217 B2
Comitato et al. (45) Date of Patent: Feb. 24, 2026

(54) SYSTEMS AND METHODS FOR ESTIMATING LIFELONG DATA TRAFFIC OF A MEMORY DEVICE

(71) Applicant: Micron Technology, Inc., Boise, ID (US)

(72) Inventors: Salvatore Comitato, San Nicola la Strada (IT); Felice Cosenza, Palma Campania (IT); Graziano Leone, Orta di Atella (IT); Lucia Santojanni, Naples (IT); Nicola Colella, Capodrise (IT)

(73) Assignee: Micron Technology, Inc., Boise, ID (US)

( * ) Notice: Subject to any disclaimer, the term of this patent is extended or adjusted under 35 U.S.C. 154(b) by 37 days.

(21) Appl. No.: 18/783,150

(22) Filed: Jul. 24, 2024

(65) Prior Publication Data

US 2025/0110843 A1 Apr. 3, 2025

Related U.S. Application Data

(60) Provisional application No. 63/541,146, filed on Sep. 28, 2023.

(51) Int. Cl.
 G06F 11/263 (2006.01)
 G06F 11/22 (2006.01)
(52) U.S. Cl.
 CPC ........ G06F 11/263 (2013.01); G06F 11/2273 (2013.01)

(58) Field of Classification Search
 CPC ........................... G06F 11/263; G06F 11/2273
 USPC .................................................... 714/33, 47.3
 See application file for complete search history.

(56) References Cited

U.S. PATENT DOCUMENTS

| | | | | |
|---|---|---|---|---|
| 11,431,606 | B2 * | 8/2022 | Rao | H04L 41/147 |
| 2019/0042136 | A1 * | 2/2019 | Nachimuthu | G06F 16/2453 |
| 2020/0411127 | A1 * | 12/2020 | Vigilante | G11C 29/56 |
| 2023/0070300 | A1 * | 3/2023 | Balzano | G06F 3/0616 |
| 2024/0281146 | A1 * | 8/2024 | Zhang | G06F 3/0631 |

* cited by examiner

*Primary Examiner* — Chae M Ko
(74) *Attorney, Agent, or Firm* — Schwegman Lundberg & Woessner, P.A.

(57) ABSTRACT

Devices and techniques for estimating lifelong data traffic of a memory device are described herein. A system includes a processing device and memory configured to store instructions to perform operations comprising: receiving a history of memory accesses to a device under test during execution of an application; identifying a partition size associated with the application; determining an address offset value based on the partition size and the application; and repeatedly applying the memory accesses over a number of iterations, the application of the memory accesses constrained to the partition size, and the memory accesses applied with each iteration beginning at an address based on a multiple of the address offset value to produce an estimation of data traffic.

18 Claims, 5 Drawing Sheets

400

402 — RECEIVE A HISTORY OF MEMORY ACCESSES OF A DEVICE DURING EXECUTION OF AN APPLICATION

404 — IDENTIFY A PARITION SIZE ASSOCAITED WITH THE APPLICATION

406 — DETERMINE AN ADDRESS OFFSET VALUE BASED ON THE PARTITION SIZE AND THE APPLICATION

408 — REPEATEDLY APPLY THE MEMORY ACCESSES OVER MULTIPLE ADDRESSES OF THE DEVICE

SYSTEMS AND METHODS FOR ESTIMATING LIFELONG DATA TRAFFIC OF A MEMORY DEVICE

PRIORITY APPLICATION

This application claims the benefit of priority to U.S. Provisional Application Ser. No. 63/541,146, filed Sep. 28, 2023, which is incorporated herein by reference in its entirety.

BACKGROUND

Memory devices are typically provided as internal, semiconductor, integrated circuits in computers or other electronic devices. There are many diverse types of memory including volatile and non-volatile memory. Volatile memory can require power to maintain data and includes random-access memory (RAM), dynamic random-access memory (DRAM), and synchronous dynamic random-access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random-access memory (RRAM), and magnetoresistive random access memory (MRAM), 3D XPoint™ memory, among others.

Memory cells are typically arranged in a matrix or an array. Multiple matrices or arrays can be combined into a memory device, and multiple devices can be combined to form a storage volume of a memory system, such as a solid-state drive (SSD), a Universal Flash Storage (UFS™) device, a MultiMediaCard (MMC) solid-state storage device, an embedded MMC device (eMMC™), etc., as discussed further below.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

To easily identify the discussion of any particular element or act, the most significant digit or digits in a reference number refer to the figure number in which that element is first introduced.

DETAILED DESCRIPTION

Figure 1:
FIG. 1 is a block diagram illustrating an example system including a host and a memory device, according to an embodiment.
Figure 1:
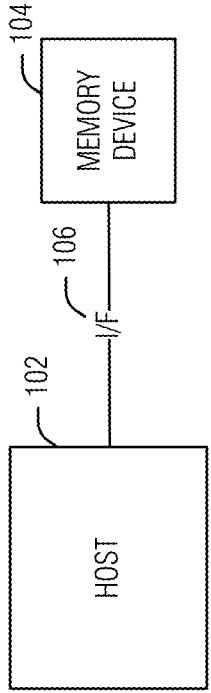

Aspects of the present disclosure are directed to estimating lifelong data traffic on a memory device. Memory devices, such as non-volatile memory devices, have a limited lifetime of use. Flash memory can be repeatedly electrically erased and reprogrammed (written to). There are two types of flash memory, NOR flash and NAND flash, which use NOR or NAND logic gates, respectively. These variants differ at the circuit level, where the relationship of the state of the bit line and word line resembles either a NAND gate or a NOR gate.

NAND flash storage is more common and many of the examples described herein refer to NAND devices; however, it is understood that the techniques described herein may be applied to any type of flash memory device.

Every flash storage device has a limited number of program/erase cycles (P/E cycle). During these P/E cycles, data is written to or erased from blocks within the memory system. Unexpected failure of a memory device may be catastrophic. What is needed is a way to better estimate the data traffic distribution over the entire lifetime of the device. The estimation of data traffic can be used in related processes, such as the design of memory controllers, design of memory architecture, design of memory cells, design or allocation of hardware in a data center, or NAND flash memory design, among others.

The systems and techniques described herein are used to simulate data traffic on a memory device over the estimated life of the device. The methodologies may be implemented using machine learning to reduce the analysis time. This type of computer-based analysis provides an improvement over real-world testing on a physical device. The techniques described herein can be more efficient, provide faster feedback, and have less environmental impact other testing techniques. Additional details are set forth below.

Memory devices can include arrays of memory cells. Managed memory devices can include a memory control unit to control or manage access to the memory arrays according to multiple memory management protocols. Memory devices include individual memory die, which may, for example, include a storage region comprising one or more arrays of memory cells, implementing one (or more) selected storage technologies. Such memory die will often include support circuitry for operating the memory array(s). Other examples, sometimes known as "managed memory devices," include assemblies of one or more memory die associated with controller functionality configured to control operation of the one or more memory die. Such controller functionality can simplify interoperability with an external device, such as a "host" device as discussed later herein. In such managed memory devices, the controller functionality may be implemented on one or more die also incorporating a memory array, or on a separate die. In other examples, one or more memory devices may be combined with controller functionality to form a solid state drive (SSD) storage volume.

Embodiments of the present disclosure are described in the example of managed memory devices implementing NAND flash memory cells. These examples can be referred to as managed NAND or mNAND devices. These examples, however, are not limiting on the scope of the disclosure, which may be implemented in other forms of memory devices and/or with other forms of storage technology.

NOR and NAND flash architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data. Flash memory cells can represent more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to refer to any memory cell(s) that can store more than one bit of data per cell (i.e., that can represent more than two programmed states).

Managed memory devices may be configured and operated in accordance with recognized industry standards. For example, managed NAND devices may be (as non-limiting examples), a Universal Flash Storage (UFS™) device, or an embedded MMC device (eMMC™), etc. For example, in the case of the above examples, UFS devices may be configured in accordance with Joint Electron Device Engineering Council (JEDEC) standards (e.g., JEDEC standard JESD223D, entitled JEDEC UFS Flash Storage 3.0, etc., and/or previous versions, updates, or subsequent versions to such standard. Similarly, identified eMMC devices may be configured in accordance with JEDEC standard JESD84-A51, entitled "JEDEC eMMC standard 5.1", again, and/or previous versions, updates, or subsequent versions to such standard.

An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact. Managed memory devices, for example managed NAND devices, can be used as primary or ancillary memory in various forms of electronic devices, and are commonly used in mobile devices.

Managed memory devices can include a number of memory devices, including a number of dies or logical units (e.g., logical unit numbers or LUNs), and can include one or more processors or other controllers performing logic functions required to operate the memory devices or interface with external systems. Such managed memory devices can include one or more flash memory die, including a number of memory arrays and peripheral circuitry thereon. The flash memory arrays can include a number of blocks of memory cells organized into a number of physical pages. Managed NAND devices can include one or more arrays of volatile and/or nonvolatile memory separate from the NAND storage array, and either within or separate from a controller. Both SSDs and managed NAND devices can receive commands from a host in association with memory operations, such as read or write operations to transfer data (e.g., user data and associated integrity data, such as error data and address data, etc.) between the memory devices and the host, or erase operations to erase data from the memory devices.

FIG. 1 is a block diagram illustrating an example system 100 including a host 102 and a memory device 104, according to an embodiment. The host 102 and memory device 104 may be communicatively coupled with a communication interface 106. The host 102 can include a host processor, a central processing unit, or one or more other devices, processors, or controllers. The memory device 104 can include one or more other memory devices. The communication interface 106 can include one or more other interfaces, depending on the host 102 and the memory device 104.

Each of the host 102 and the memory device 104 can include a number of receiver or driver circuits configured to send or receive signals over the communication interface 106, or interface circuits, such as data control units, sampling circuits, or other intermedia circuits configured to process data to be communicated over, or otherwise process data received from the communication interface 106 for use by the host 102, the memory device 104, or one or more other circuits or devices.

The memory device 104 can include a memory array (e.g., one or more arrays of memory cells, such as a NAND flash memory array, or one or more other memory arrays), a memory control unit, and in certain examples, an interface circuit between the memory array and the memory control unit. In certain examples, the memory device can include a number of memory die, each having control logic separate from the memory control unit. The memory control unit can include an application specific integrated circuit (ASIC), a field programmable gate array (FPGA), or one or more other processing circuits arranged or programmed to manage data transfers or operations to, from, or within the memory array.

During operation of the host 102, an application may execute on the host 102 that accesses the memory device 104. A logging application may monitor the application and its accesses of the memory device 104. The resulting memory access log is referred to as a "trace" or a "trace log." The trace log can include, for example, a sequence of memory commands, resulting in data traffic between the host 102 and the memory device 104.

Figure 2:
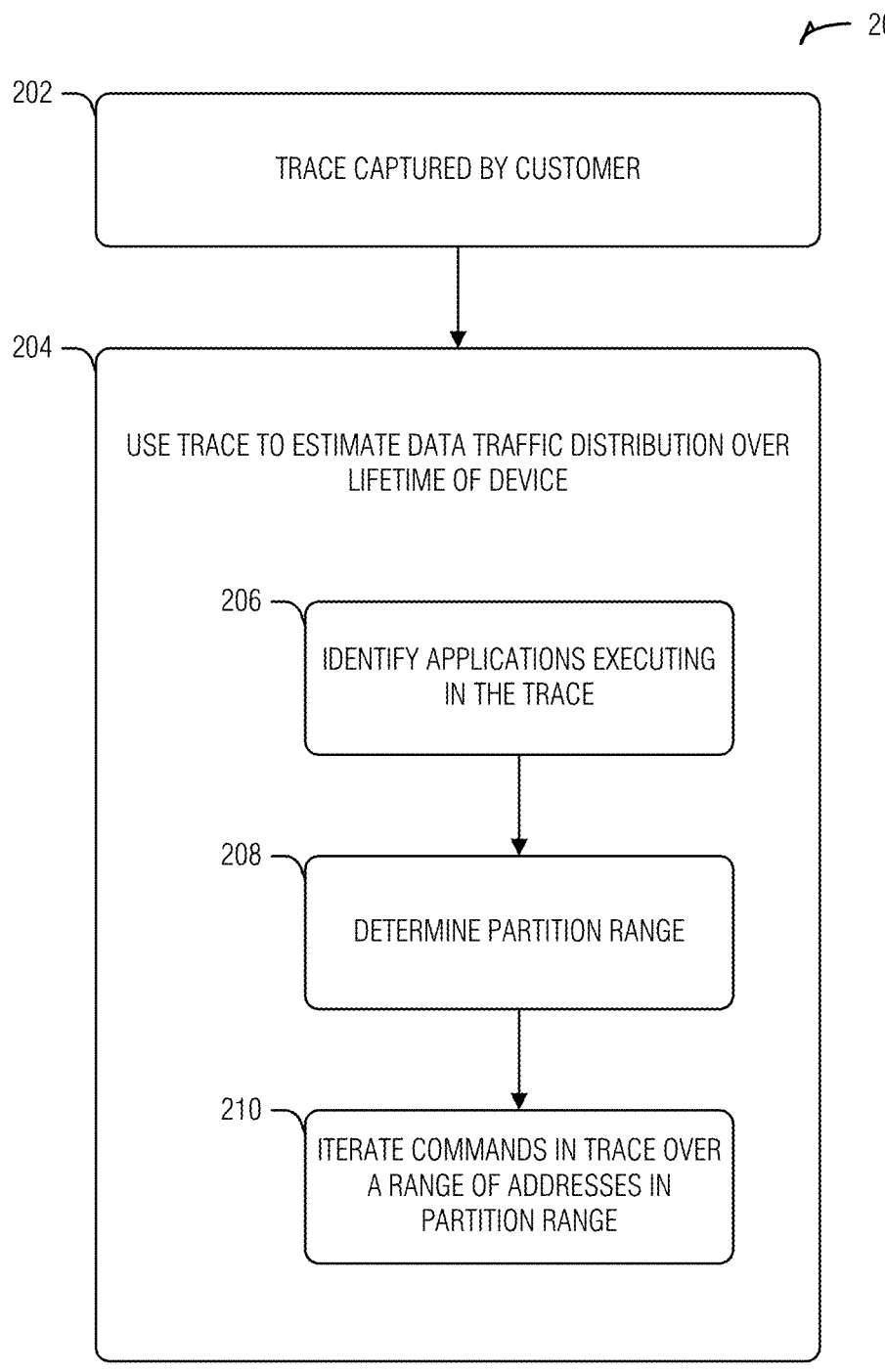
FIG. 2 is a block diagram illustrating the process of estimating lifelong data traffic by a simulation system, according to an embodiment.

FIG. 2 is a block diagram illustrating the process of estimating lifelong data traffic 200, such as can be performed by or using a device usage simulation system, according to an embodiment. At operation 202, a trace is captured by a user or customer. The trace may include a sequence of memory commands, such as mNAND command sequences. The trace may capture activity for a limited time, such as ten minutes, an hour, several hours, or even one or more days. The trace may include memory commands for a single application or for several applications that access the memory device.

At operation 204, the trace is used by the device usage simulation system to estimate the data traffic distribution over an entire expected lifetime of the memory device. In previous systems, the trace was analyzed and used to create iterations of memory commands. However, the present inventors have recognized that it is difficult or impossible to accurately estimate the device key parameters at the end of device life by merely iterating the same commands in the trace many times. As such, in the present systems, a memory address offset is used between each iteration. This methodology allows for the convergence of the simulated device behavior to a real-world use in a shorter time.

As such, at operation 204, starting from the trace and memory device configuration received at operation 202, the captured data traffic distribution can be identified. Further, at operation 206, the application(s) executing on the system during the time of the trace may be identified based on hit addresses.

An application's memory access behavior may be known to the simulation system. For instance, a journaling application may use sequential writes to a partition range [0,128] MB. The journaling application may use a circular buffer with force unit access (FUA) set for writes to a subset of allocated memory in a universal flash storage (UFS) device. The commands used and the behavior of the memory accesses may be used to identify the journaling application.

At operation 208, a partition range is determined. This partition range may be based on the memory address range allocated to the application. Alternatively, the partition range may be an arbitrary range, such as a $2^x$ range (e.g., 16 MB, 32 MB, 64 MB, 128 MB, etc.) that is based on the distribution of memory accesses in the trace.

At operation 210, the trace is used to simulate data traffic on the memory device by iterating the commands sequence over a range of addresses. The simulation system can be configured to modify the commands sequence in the trace to age the memory device without affecting its behavior (e.g., key parameters). Key parameters include, but are not limited to Average Program/Erase cycles of each Virtual Block, Write Amplification Factor (WAF), and Total Bytes Written (TBW). After each iteration of commands, the simulation system applies an offset to the addresses. According to this change, the methodology consists of the repetition in loops of the input trace with recomputed addresses for each iteration to accelerate the convergence of the device behavior to a real use in a relatively short time.

The first repetition, loop0, is the emulation of the system trace without the addresses adjusted. For each repetition after the first one, the simulation system applies a fixed offset to the addresses of the application's write/read sequences to cover the whole partition to which the application belongs.

In an example, the value of the address offset is determined based on the type of the application and the size of the partition. In various embodiments, the offset is application-specific and dependent on the device configuration (e.g., number or size of partitions). The offset may be chosen in a manner to not hit the same addresses impacted by the original trace in the partition, but instead to hit the unused partition addresses allocated for the specific application.

Figure 3:
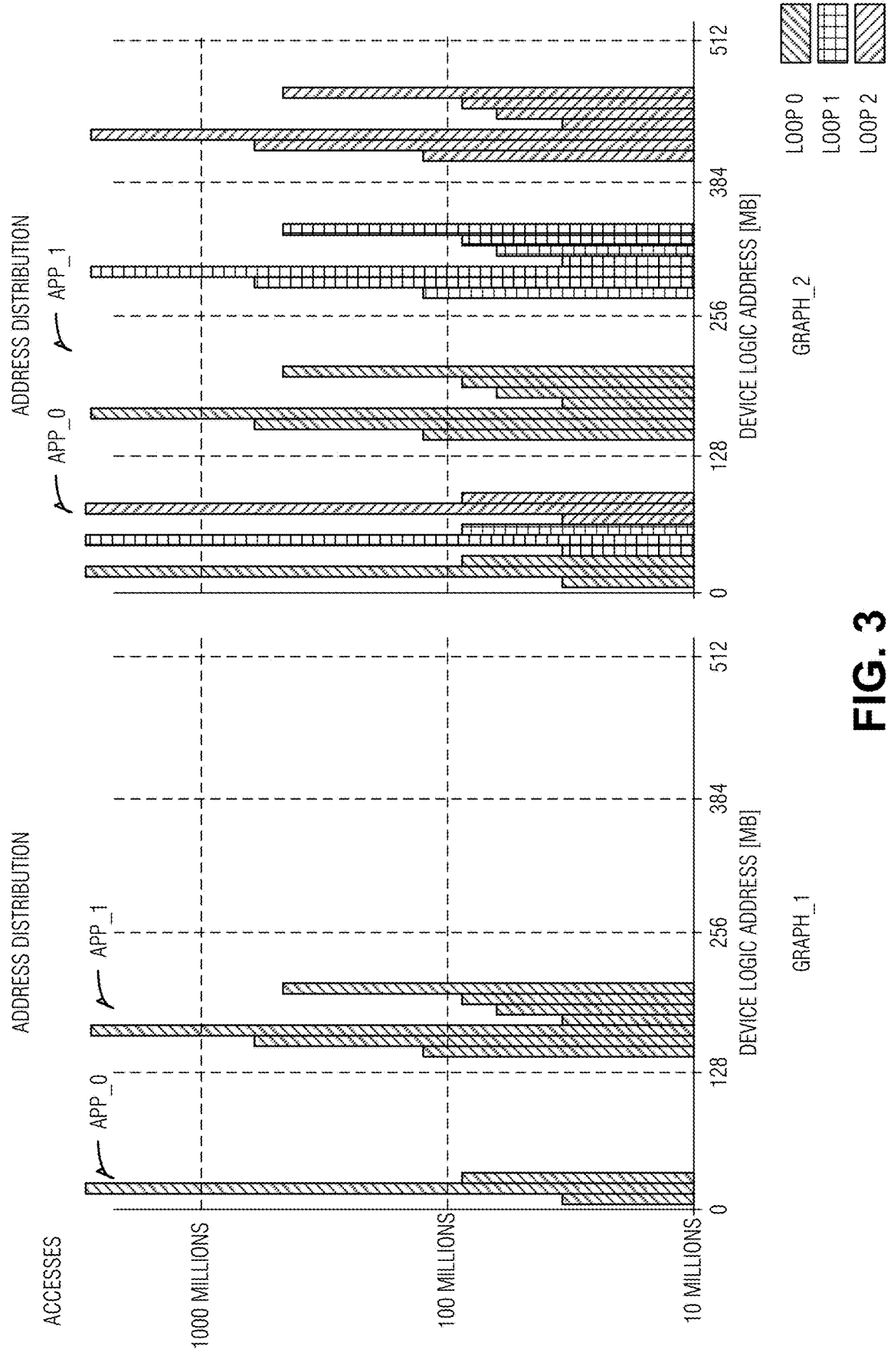
FIG. 3 is a diagram illustrating two graphs, Graph_1 and Graph_2, which illustrate address distribution, according to an embodiment.

FIG. 3 is a diagram illustrating two graphs, Graph_1 and Graph_2, which illustrate address distribution, according to an embodiment. Graph_1 illustrates the address distribution of memory commands from a trace. It includes memory commands for a first application (app_0) and a second application (app_1). For this example, app_0 has a partition range of [0,128] MB, and app_1 has a partition range of [128, 512] MB.

Graph_2 illustrates the address distribution of three iterations of the address used by the applications. The iterations are offset by an application-specific offset. As can be seen, the address distributions for app_0 are offset by the size of the first iteration. In this way, the iterations will cover all of the addresses not yet hit by starting from the next address after the highest address from the trace. If a new address is calculated that is greater than the partition size, then the new address is generated by left-shifting the offset address by, e.g., 128 MB.

In the example of app_1, the address is offset by a value that moves the address distribution through the partition's range. Here, the address range is offset by almost 128 MB. Because the offset is not an evenly divisible amount of the total partition range, over time, the address distributions will eventually completely overlap and evenly distribute across the entire partition range.

In an embodiment, the number of iterations is an input evaluated from a customer's request and may be dependent on a device's estimated lifetime endurance. In particular, in an example, the longer an estimated lifetime endurance, the more iterations are used to determine lifelong data traffic. In another embodiment, the number of iterations used is based on a data traffic during of the trace. The longer the trace log, the more iterations may be used. The number of iterations used may be based on a combination of factors including customer request, estimated device life, length of log, data traffic in a trace, or the like.

Figure 4:
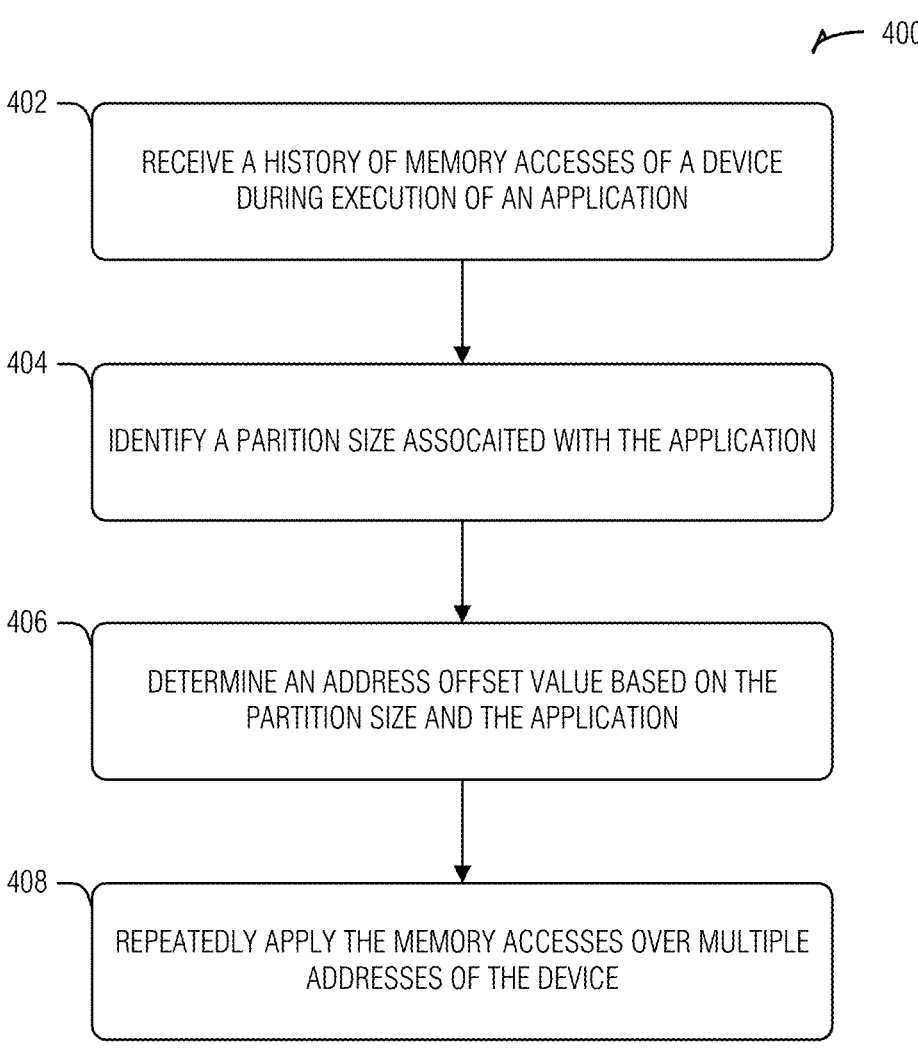
FIG. 4 is a flowchart illustrating an example method for estimating lifelong data traffic of a memory device, in accordance with some embodiments.

FIG. 4 is a flowchart illustrating an example method 400 for estimating lifelong data traffic of a memory device, in accordance with some embodiments. The method 400 can be performed by processing logic that can include hardware (e.g., processing device, circuitry, dedicated logic, programmable logic, microcode, hardware of a device, integrated circuit, etc.). In some embodiments, the method 400 is performed by the hardware processor 502 of FIG. 5.

At operation 402, the method 400 includes the operation of receiving a history of memory accesses to the device under test during execution of an application.

At operation 404, the method 400 includes the operation of identifying a partition size associated with the application. In an embodiment, identifying the partition size includes accessing a trace log and determining the partition size based on the trace log.

At operation 406, the method 400 includes the operation of determining an address offset value based on the partition size and the application. In an embodiment, determining the address offset value includes identifying a pattern of memory accesses within the partition size and determining the address offset to effectively move the pattern of memory accesses to fully cover addresses over the partition size.

In an embodiment, determining the address offset value includes identifying a lowest address and a highest address in a range of addresses used in the history of memory accesses and calculating the address offset value to move the range of addresses to the next address after the highest address.

In an embodiment, determining the address offset value includes calculating a size of a memory address range of addresses used in the history of memory accesses and calculating the address offset value to have a beginning address offset by the previous beginning address and the size of the memory address range.

In an embodiment, determining the address offset value includes calculating a size of a memory address range of addresses used in the history of memory accesses and calculating the address offset value based on the size of the memory address range and a size of the total memory address space in the device under test. In a further embodiment, the size of the total memory address space is into a plurality of partitions, and wherein the address offset value is based on a size of a partition of one of the plurality of partitions.

At operation 408, the method 400 includes the operation of repeatedly applying the memory accesses over a number of iterations, the application of the memory accesses constrained to the partition size, and the memory accesses applied with each iteration beginning at an address based on a multiple of the address offset value to produce an estimation of data traffic. In an embodiment, the number of iterations is based on an estimated lifetime of the device under test. In an embodiment, the number of iterations is based on a data traffic duration of trace operation.

Although shown in a particular sequence or order, unless otherwise specified, the order of the methods or processes described herein can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. Other process flows are possible.

Figure 5:
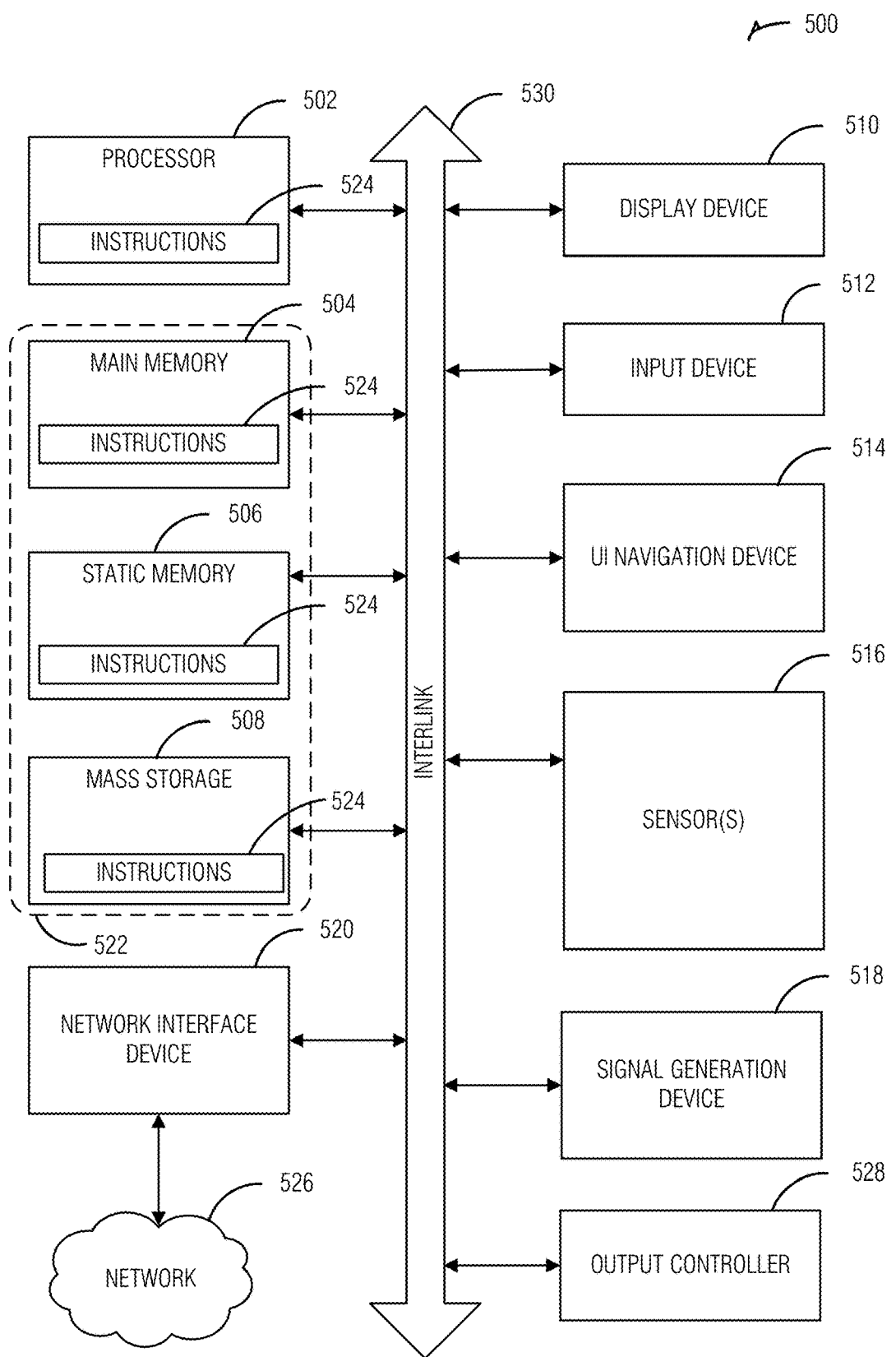
FIG. 5 illustrates a block diagram of an example machine with which, in which, or by which any one or more of the techniques (e.g., methodologies) discussed herein can be implemented.

FIG. 5 illustrates a block diagram of an example machine 500 with which, in which, or by which any one or more of the techniques (e.g., methodologies) discussed herein can be implemented. Examples, as described herein, can include, or can operate by, logic or a number of components, or mechanisms in the machine 500. Circuitry (e.g., processing circuitry) is a collection of circuits implemented in tangible entities of the machine 500 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 500.

In alternative embodiments, the machine 500 can operate as a standalone device or can be connected (e.g., networked) to other machines. In a networked deployment, the machine 500 can operate in the capacity of a server machine, a client machine, or both in server-client network environments. In an example, the machine 500 can act as a peer machine in peer-to-peer (P2P) (or other distributed) network environment. The machine 500 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine 500 (e.g., computer system) can include a hardware processor 502 (e.g., a central processing unit (CPU), a graphics processing unit (GPU), a hardware processor core, or any combination thereof), a main memory 504, a static memory 506 (e.g., memory or storage for firmware, microcode, a basic-input-output (BIOS), unified extensible firmware interface (UEFI), etc.), and mass storage device 508 (e.g., hard drives, tape drives, flash storage, or other block devices) some or all of which can communicate with each other via an interlink 530 (e.g., bus). The machine 500 can further include a display device 510, an alphanumeric input device 512 (e.g., a keyboard), and a user interface (UI) Navigation device 514 (e.g., a mouse). In an example, the display device 510, the input device 512, and the UI navigation device 514 can be a touch screen display. The machine 500 can additionally include a mass storage device 508 (e.g., a drive unit), a signal generation device 518 (e.g., a speaker), a network interface device 520, and one or more sensor(s) 516, such as a global positioning system (GPS) sensor, compass, accelerometer, or other sensor. The machine 500 can include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the hardware processor 502, the main memory 504, the static memory 506, or the mass storage device 508 can be, or include, a machine-readable media 522 on which is stored one or more sets of data structures or instructions 524 (e.g., software) embodying or used by any one or more of the techniques or functions described herein. The instructions 524 can also reside, completely or at least partially, within any of registers of the hardware processor 502, the main memory 504, the static memory 506, or the mass storage device 508 during execution thereof by the machine 500. In an example, one or any combination of the hardware processor 502, the main memory 504, the static memory 506, or the mass storage device 508 can constitute the machine-readable media 522. While the machine-readable media 522 is illustrated as a single medium, the term "machine-readable medium" can include a single medium or multiple media (e.g., a centralized or distributed database, or associated caches and servers) configured to store the one or more instructions 524.

The term "machine readable medium" can include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine-readable media 522 can be representative of the instructions 524, such as instructions 524 themselves or a format from which the instructions 524 can be derived. This format from which the instructions 524 can be derived can include source code, encoded instructions (e.g., in compressed or encrypted form), packaged instructions (e.g., split into multiple packages), or the like. The information representative of the instructions 524 in the machine-readable media 522 can be processed by processing circuitry into the instructions to implement any of the operations discussed herein. For example, deriving the instructions 524 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 524.

In an example, the derivation of the instructions 524 can include assembly, compilation, or interpretation of the information (e.g., by the processing circuitry) to create the instructions 524 from some intermediate or preprocessed format provided by the machine-readable media 522. The information, when provided in multiple parts, can be combined, unpacked, and modified to create the instructions 524. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 524 can be further transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE)

802.11 family of standards known as Wi-Fi®, IEEE 802.16 family of standards known as WiMax®), IEEE 802.15.4 family of standards, peer-to-peer (P2P) networks, among others. In an example, the network interface device 520 can include one or more physical jacks (e.g., Ethernet, coaxial, or phone jacks) or one or more antennas to connect to the network 526. In an example, the network interface device 520 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software. A transmission medium is a machine readable medium.

To better illustrate the methods and apparatuses described herein, a non-limiting set of Example embodiments are set forth below as numerically identified Examples.

Example 1 is a system comprising: a processing device; and memory configured to store instructions, which when executed by the processing device, cause the processing device to perform operations comprising: receiving a history of memory accesses to a device under test during execution of an application; identifying a partition size associated with the application; determining an address offset value based on the partition size and the application; and repeatedly applying the memory accesses over a number of iterations, the application of the memory accesses constrained to the partition size, and the memory accesses applied with each iteration beginning at an address based on a multiple of the address offset value to produce an estimation of data traffic.

In Example 2, the subject matter of Example 1 includes, wherein identifying the partition size comprises: accessing a trace log; and determining the partition size based on the trace log.

In Example 3, the subject matter of Examples 1-2 includes, wherein determining the address offset value comprises: identifying a pattern of memory accesses within the partition size; and determining the address offset to effectively move the pattern of memory accesses to fully cover addresses over the partition size.

In Example 4, the subject matter of Examples 1-3 includes, wherein determining the address offset value comprises: identifying a lowest address and a highest address in a range of addresses used in the history of memory accesses; and calculating the address offset value to move the range of addresses to the next address after the highest address.

In Example 5, the subject matter of Examples 1-4 includes, wherein determining the address offset value comprises: calculating a size of a memory address range of addresses used in the history of memory accesses; and calculating the address offset value to have a beginning address offset by the previous beginning address and the size of the memory address range.

In Example 6, the subject matter of Examples 1-5 includes, wherein determining the address offset value comprises: calculating a size of a memory address range of addresses used in the history of memory accesses; and calculating the address offset value based on the size of the memory address range and a size of the total memory address space in the device under test.

In Example 7, the subject matter of Example 6 includes, wherein the size of the total memory address space is into a plurality of partitions, and wherein the address offset value is based on a size of a partition of one of the plurality of partitions.

In Example 8, the subject matter of Examples 1-7 includes, wherein the number of iterations is based on an estimated lifetime of the device under test.

In Example 9, the subject matter of Examples 1-8 includes, wherein the number of iterations is based on a data traffic duration of trace operation.

Example 10 is a method for estimating lifelong data traffic of a device under test comprising: receiving a history of memory accesses to the device under test during execution of an application; identifying a partition size associated with the application; determining an address offset value based on the partition size and the application; and repeatedly applying the memory accesses over a number of iterations, the application of the memory accesses constrained to the partition size, and the memory accesses applied with each iteration beginning at an address based on a multiple of the address offset value to produce an estimation of data traffic.

In Example 11, the subject matter of Example 10 includes, wherein identifying the partition size comprises: accessing a trace log; and determining the partition size based on the trace log.

In Example 12, the subject matter of Examples 10-11 includes, wherein determining the address offset value comprises: identifying a pattern of memory accesses within the partition size; and determining the address offset to effectively move the pattern of memory accesses to fully cover addresses over the partition size.

In Example 13, the subject matter of Examples 10-12 includes, wherein determining the address offset value comprises: identifying a lowest address and a highest address in a range of addresses used in the history of memory accesses; and calculating the address offset value to move the range of addresses to the next address after the highest address.

In Example 14, the subject matter of Examples 10-13 includes, wherein determining the address offset value comprises: calculating a size of a memory address range of addresses used in the history of memory accesses; and calculating the address offset value to have a beginning address offset by the previous beginning address and the size of the memory address range.

In Example 15, the subject matter of Examples 10-14 includes, wherein determining the address offset value comprises: calculating a size of a memory address range of addresses used in the history of memory accesses; and calculating the address offset value based on the size of the memory address range and a size of the total memory address space in the device under test.

In Example 16, the subject matter of Example 15 includes, wherein the size of the total memory address space is into a plurality of partitions, and wherein the address offset value is based on a size of a partition of one of the plurality of partitions.

In Example 17, the subject matter of Examples 10-16 includes, wherein the number of iterations is based on an estimated lifetime of the device under test.

In Example 18, the subject matter of Examples 10-17 includes, wherein the number of iterations is based on a data traffic duration of trace operation.

Example 19 is at least one machine-readable medium including instructions that, when executed by processing circuitry, cause the processing circuitry to perform operations to implement of any of Examples 1-18.

Example 20 is an apparatus comprising means to implement of any of Examples 1-18.

Example 21 is a system to implement of any of Examples 1-18.

Example 22 is a method to implement of any of Examples 1-18.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:
1. A system comprising:
a processing device; and
memory configured to store instructions, which when executed by the processing device, cause the processing device to perform operations comprising:
receiving a history of memory accesses to a device under test during execution of an application;
identifying a partition size associated with the application;

determining an address offset value based on the partition size and the application; and repeatedly applying the memory accesses over a number of iterations, the application of the memory accesses constrained to the partition size, and the memory accesses applied with each iteration beginning at an address based on a multiple of the address offset value to produce an estimation of data traffic.

2. The system of claim 1, wherein identifying the partition size comprises:

accessing a trace log; and determining the partition size based on the trace log.

3. The system of claim 1, wherein determining the address offset value comprises:

identifying a pattern of memory accesses within the partition size; and determining the address offset to effectively move the pattern of memory accesses to fully cover addresses over the partition size.

4. The system of claim 1, wherein determining the address offset value comprises:

identifying a lowest address and a highest address in a range of addresses used in the history of memory accesses; and calculating the address offset value to move the range of addresses to the next address after the highest address.

5. The system of claim 1, wherein determining the address offset value comprises:

calculating a size of a memory address range of addresses used in the history of memory accesses; and calculating the address offset value to have a beginning address offset by the previous beginning address and the size of the memory address range.

6. The system of claim 1, wherein determining the address offset value comprises:

calculating a size of a memory address range of addresses used in the history of memory accesses; and calculating the address offset value based on the size of the memory address range and a size of the total memory address space in the device under test.

7. The system of claim 6, wherein the size of the total memory address space is into a plurality of partitions, and wherein the address offset value is based on a size of a partition of one of the plurality of partitions.

8. The system of claim 1, wherein the number of iterations is based on an estimated lifetime of the device under test.

9. The system of claim 1, wherein the number of iterations is based on a data traffic duration of trace operation.

10. A method for estimating lifelong data traffic of a device under test comprising:

receiving a history of memory accesses to the device under test during execution of an application;

identifying a partition size associated with the application;

determining an address offset value based on the partition size and the application; and repeatedly applying the memory accesses over a number of iterations, the application of the memory accesses constrained to the partition size, and the memory accesses applied with each iteration beginning at an address based on a multiple of the address offset value to produce an estimation of data traffic.

11. The method of claim 10, wherein identifying the partition size comprises:

accessing a trace log; and determining the partition size based on the trace log.

12. The method of claim 10, wherein determining the address offset value comprises:

identifying a pattern of memory accesses within the partition size; and determining the address offset to effectively move the pattern of memory accesses to fully cover addresses over the partition size.

13. The method of claim 10, wherein determining the address offset value comprises:

identifying a lowest address and a highest address in a range of addresses used in the history of memory accesses; and calculating the address offset value to move the range of addresses to the next address after the highest address.

14. The method of claim 10, wherein determining the address offset value comprises:

calculating a size of a memory address range of addresses used in the history of memory accesses; and calculating the address offset value to have a beginning address offset by the previous beginning address and the size of the memory address range.

15. The method of claim 10, wherein determining the address offset value comprises:

calculating a size of a memory address range of addresses used in the history of memory accesses; and calculating the address offset value based on the size of the memory address range and a size of the total memory address space in the device under test.

16. The method of claim 15, wherein the size of the total memory address space is into a plurality of partitions, and wherein the address offset value is based on a size of a partition of one of the plurality of partitions.

17. The method of claim 10, wherein the number of iterations is based on an estimated lifetime of the device under test.

18. The method of claim 10, wherein the number of iterations is based on a data traffic duration of trace operation.

* * * * *